UNITED STATES PATENT OFFICE.

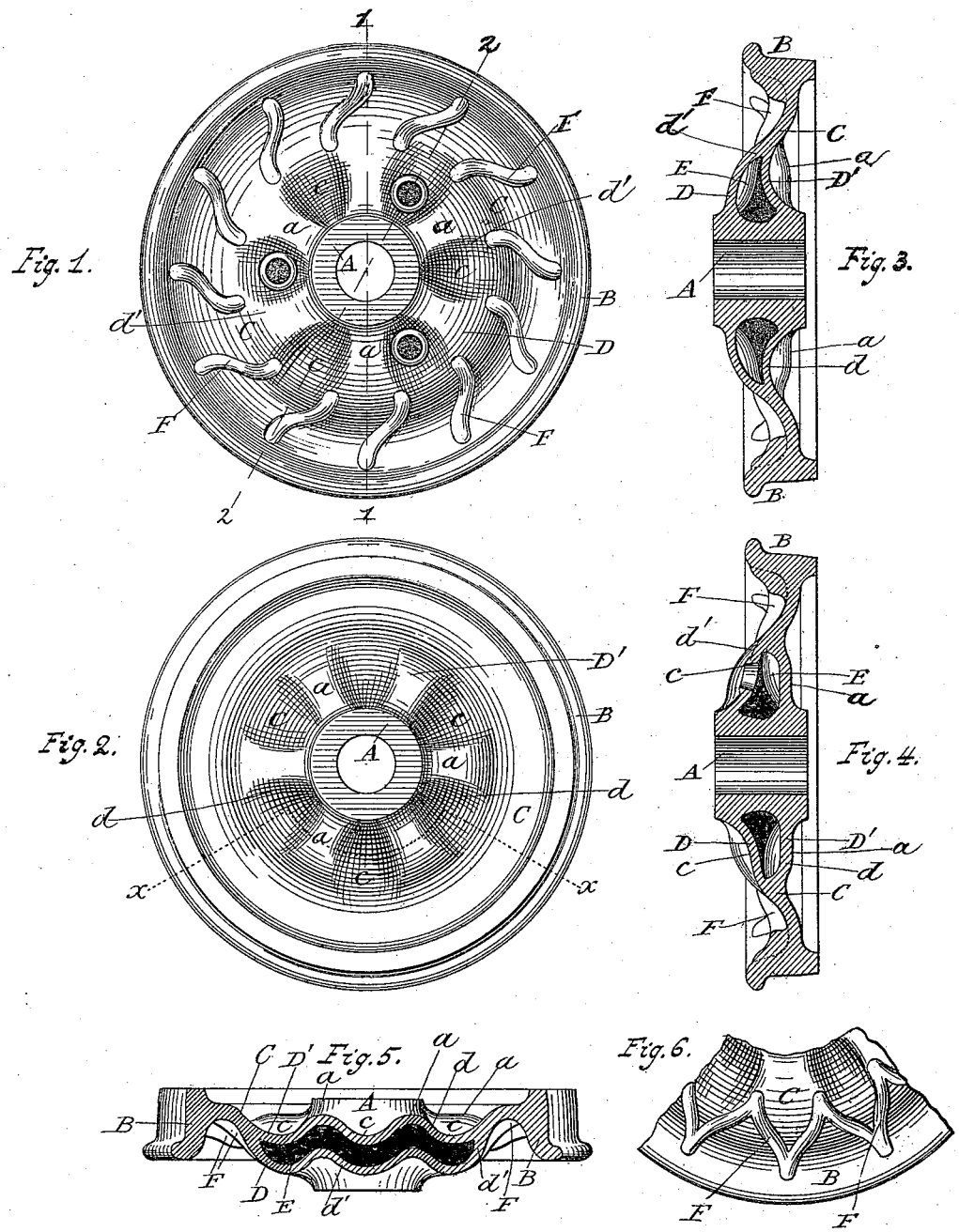

WILLIAM HAILES, OF ALBANY, NEW YORK.

CAR-WHEEL.

SPECIFICATION forming part of Letters Patent No. 441,241, dated November 25, 1890.

Application filed July 16, 1890. Serial No. 358,992. (No model.)

*To all whom it may concern:*

Be it known that I, WILLIAM HAILES, a citizen of the United States, residing at Albany, in the county of Albany and State of New York, have invented new and useful Improvements in Cast-Metal Car-Wheels, of which the following is a specification.

My invention relates to the class of car-wheels known as "double-plate" or "hollow cast-metal" car-wheels; and it consists of a cast-metal wheel having integral with its hub and rim web portions a chambered section which is concentric with both said hub and rim and has walls that are continuously corrugated by corrugations which are substantially radial from the hub, as hereinafter described, and particularly set forth in the claims.

The objects of my invention are, first, to produce a double-plate and hollow or chambered cast-metal wheel in which one of the two walls integral with both the hub and web neighboring the rim and inclosing a chamber concentric with both the said hub and web portions will have a circular series of corrugations or wrinkles which have their projections and depressions running radially from the hub to said web and the rim; second, to produce a double-plate or hollow or chambered wheel in which both of the walls (inclosing a chamber concentric with the hub and rim) will be integral with both the said hub and rim or web at the rim and have each a circular series of corrugations which have their projections and depressions extended radially from the hub toward the rim, and, third, to produce a double-plate or hollow or chambered cast-metal wheel in which the two walls (inclosing the chamber of the wheel) will be integral with both the hub and the web at the rim, and also be continuously corrugated by a series of corrugations which are extended radially from the hub to the web at the rim, and the said web at the rim have integral with it brackets which are integral with one of said corrugated walls or sides of the chamber of the wheel. I attain these objects by the means illustrated in the accompanying drawings, forming a part of this specification, in which—

Figure 1 is a view of my improved wheel, taken from its rear side. Fig. 2 is a view of the same, taken from its front side. Fig. 3 is a sectional view taken at line 1 in Fig. 1. Fig. 4 is a sectional view taken at line 2 in Fig. 2. Fig. 5 is a section taken at line $xx$ in Fig. 2; and Fig. 6 is a section of wheel, showing a modification of the arrangement of the brackets.

The same letters of reference refer to like parts or elements throughout the several views.

In the drawings, A is the hub of the wheel. B is the rim. C is the web neighboring the rim B and integral with the same, and D D' are webs which are each integral with each other and with both the hub A and web C and form the side-plate portions or walls of the chamber E, formed continuously between the said hub and web C and concentric with the same. The webs D D', constituting the oppositely-located walls of the chamber E and integral with the hub and web at the rim of the wheel, have heretofore been made uniformly plain in direction concentric with the said hub and web, and in each said plate or wall the portions of surface at like radii from the center of the wheel were on the same plane. In this improved wheel at least one of the said two plates or wall-sections D D' is continuously corrugated or wrinkled, so as to have in it (as in plate or wall-section D) the corrugations $d\ d$, which corrugations are relatively radial from the hub A (at which they commence) and are extended to the web C, (at which they terminate,) and although but one of these side plate or wall sections or portions, as D, may be provided with the corrugations $d\ d$, yet I prefer to have both the said plates or wall-sections D and D' corrugated in a similar manner, with their respective corrugations $d\ d'$, Fig. 5, extended so that their respective projections $a$ and depressions $c$ will run relatively radial from the hub A to the web C, as they are respectively illustrated in Figs. 1 and 2. These corrugations $d$ or $d$ and $d'$ of the plate or wall-sections D D' operate to materially increase the strength of the latter not only in the body of the web of each, but also at their lines of connection with the hub A and web C, with which said plate or wall-sections D D' are integral, and by the employment of the said corrugations in portions D or D', or both, wheels of light weight of metal, as the old kinds of plain double-plate or hollow wheel, will be stronger to resist lateral or vertical strain than such old wheels.

The web C has on one side thereof and integral with it, and also with both the rim B and one of the corrugated wall-sections, (as D,') a series of brackets F, which brackets are made with a suitable width and extension of projection from said web, and can be made with any desired shape and be arranged on direct radial lines from the hub, yet I prefer to give to these brackets compound curved shapes and arrange them at an angle with lines which are directly radial from the hub and substantially as shown in Figs. 1 and 2. In some cases these brackets can be made to be duplex in character by adding similarly-shaped brackets reversely arranged, so that the outer ends of each will connect with a neighboring bracket and its inner end connect with the inner end of the other neighboring bracket, as illustrated in Fig. 6. These brackets F (heretofore used on single-plate wheels and in the old plain or double-plate or hollow wheel) co-operate with the corrugated web-plate or wall portions D D', or both, to strengthen the web C and its connection with the said corrugated portions D D' of the wheel and give to it greater strength than is had in the old form of wheels of like size and weight.

Having described my invention, what I claim, and desire to secure by Letters Patent, is—

1. A double-plate or hollow cast-metal wheel which has one of the web-plates or wall portions, as D, of the chamber E provided with the circular series of corrugations $d\,d$, which have their projections and depressions extended substantially radially from the hub to the web C at the rim and is integral with said hub opposite side plate or wall of said chamber, and the web C, substantially as and for the purposes set forth.

2. A double-plate or hollow cast-metal wheel which has both wall portions D and D' of the chamber E provided with a circular series of corrugations, as $d\,d$ and $d'\,d'$, which have their projections and depressions extended substantially radially from the hub toward the rim and are integral with the hub, with each other, and the web C at the rim, substantially as and for the purposes set forth.

3. A double-plate or hollow cast-metal wheel which has one of the walls, as D, provided with corrugations $d\,d$, extended radially from the hub and integral with it and with the opposite side wall, as D', and with the web C at the rim B, and with the brackets F F, arranged across the said web C and integral with it and the corrugated wall and rim B, substantially as and for the purposes set forth.

WILLIAM HAILES.

Witnesses:
CHARLES SELKIRK,
A. SELKIRK, Jr.